United States Patent
Frick

(10) Patent No.: US 8,305,071 B2
(45) Date of Patent: Nov. 6, 2012

(54) APPARATUS AND METHOD FOR MEASUREMENT OF THE MUZZLE VELOCITY OF A PROJECTILE OR THE LIKE

(75) Inventor: Henry Roger Frick, Hettlingen (CH)

(73) Assignee: Rheinmetall Air Defence AG, Zürich (CH)

(*) Notice: Subject to any disclaimer, the term of this patent is extended or adjusted under 35 U.S.C. 154(b) by 533 days.

(21) Appl. No.: 12/469,793

(22) Filed: May 21, 2009

(65) Prior Publication Data

US 2009/0289619 A1 Nov. 26, 2009

Related U.S. Application Data

(60) Provisional application No. 61/159,918, filed on Mar. 13, 2009.

(30) Foreign Application Priority Data

May 21, 2008 (DE) .......................... 10 2008 024 574

(51) Int. Cl.
G01P 3/42 (2006.01)
(52) U.S. Cl. ............... 324/160; 324/178; 124/3; 73/167
(58) Field of Classification Search ...... 124/3; 324/104, 324/160, 178; 73/167
See application file for complete search history.

(56) References Cited

U.S. PATENT DOCUMENTS

| 4,283,989 | A | | 8/1981 | Toulios et al. | |
|---|---|---|---|---|---|
| 4,672,316 | A | * | 6/1987 | Ettel | 324/202 |
| 4,928,523 | A | * | 5/1990 | Muhrer et al. | 73/167 |
| 5,081,901 | A | * | 1/1992 | Kemeny et al. | 89/8 |
| 6,032,568 | A | | 3/2000 | Fuller et al. | |
| 6,064,196 | A | * | 5/2000 | Oberlin et al. | 324/179 |
| 2006/0075817 | A1 | * | 4/2006 | Yuhas | 73/598 |
| 2007/0074625 | A1 | | 4/2007 | Seidensticker | |
| 2008/0211710 | A1 | | 9/2008 | Frick | |

FOREIGN PATENT DOCUMENTS

| DE | 697 09291 | 8/2002 |
|---|---|---|
| DE | 10 2005 024 179 | 11/2006 |
| DE | 10 2006 058 375.2 | 6/2008 |
| EP | 0 023 365 | 2/1981 |

* cited by examiner

*Primary Examiner* — Arleen M Vazquez
(74) *Attorney, Agent, or Firm* — Lucas & Mercanti, LLP; Klaus P. Stoffel

(57) ABSTRACT

An apparatus and method for measuring muzzle velocity ($V_0$) of a projectile, which apparatus includes a smooth weapon barrel or firing barrel as a waveguide, a signal generator which is electrically connected via a signal supply line to at least one transmission coupler in order to energize the weapon barrel or firing barrel, and a receiving line for passing on the signals measured at at least one receiving coupler to an evaluation device. If the velocity is measured after the projectile has passed through, the receiving coupler is located between the projectile base and the transmission coupler, while the receiving coupler is between the projectile nose and the transmission coupler when the velocity ($V_0$) is measured before the projectile passes through. The electromagnetic field of the empty weapon barrel is measured without a projectile, in front of the projectile or behind the projectile, or in combination. The muzzle velocity ($V_0$) is then determined from the measured signals.

4 Claims, 1 Drawing Sheet

APPARATUS AND METHOD FOR MEASUREMENT OF THE MUZZLE VELOCITY OF A PROJECTILE OR THE LIKE

This application is a non-provisional application of U.S. 61/159,918 filed Mar. 13, 2009, which in turn claims the priority of DE 10 2008 024 574.7. filed May 21, 2008, the priority of both applications is hereby claimed and both applications are incorporated by reference herein.

BACKGROUND OF THE INVENTION

DE 697 09 291 T2 (EP 0 840 087 B1) discloses means for controlling the initial velocity of a projectile. In this case, a sensor means is provided which can measure a parameter that is related to the muzzle velocity. This is done with the aid of the sensors, which are fitted at least in or on the weapon barrel and can record a higher pressure in the weapon barrel, which is caused by the heating of the propellant gases on the weapon barrel. Strain gauges are proposed as sensors, and are adapted such that they make contact with the weapon barrel. In this case, the expansion of the weapon barrel is measured. The movement and therefore the velocity of the projectile are determined by the two individual sensors from the time difference between registration of the projectile passage.

DE 10 2005 024 179 A1 dispenses entirely with direct measurement of the current muzzle velocity, since the actual muzzle velocity is determined by information relating to the current airspeed of the projectile, that is to say is calculated back from this. This current projectile velocity is then used to correct the detonation time of the projectile with the aid of a detonation time preset using a standard muzzle velocity, and this is used as the current fuze setting time. A microwave transmitter, preferably in the GHz range, is used to transmit this information to the projectile and sends the current temperature, determined for example by a fire control computer, to the munition or to a projectile.

A further method is to operate the tube as a round waveguide and to measure the Doppler velocity of the projectile in the barrel, as disclosed in EP 0 023 365 A2. In this case, the frequency of the signal is above the cut-off frequency for the relevant waveguide mode. The electromagnetic wave which is formed in this case propagates in the barrel and is reflected from the projectile. A Doppler frequency shift also occurs, as a function of the instantaneous velocity.

DE 10 2006 058 375.2, which was not published prior to this, proposes that the weapon barrel or the firing barrel and/or parts of the muzzle brake be used as a waveguide (a waveguide is a tube with a characteristic cross-sectional shape which has a very highly electrically conductive wall, in particular, rectangular and round waveguides are in widespread use for technical purposes), which, however, is operated below the cut-off frequency of the relevant waveguide mode.

SUMMARY OF THE INVENTION

Following the same idea, the invention is based on the object of specifying a further measurement method which allows excellent and precise determination of the muzzle velocity of a projectile or the like.

The invention is based on the idea of designing the waveguide as a smooth barrel of any desired cross section, in contrast to that in the application (see above) which was not published prior to this and in which a waveguide provided with a profile is used as the waveguide. Furthermore, the electromagnetic field is detected in the absence of the projectile with the aid of at least a transmission coupler and a receiver coupler, that is to say before the projectile passes through the waveguide. The most recent sample values before each projectile passes through are used to calibrate the measurement. The calibration therefore includes all the temperature-dependent influences and other influences. When the projectile passes through, the rate of change of the electromagnetic field is detected, and is normalized using the calibration. The muzzle velocity is thus measured independently of temperature changes or other influences.

The muzzle velocity itself is preferably measured or determined in front of and/or behind the projectile. If the measurement is carried out in front of the projectile, consideration is given to the fact that the nose of the projectile influences the electromagnetic field as it passes through the waveguide. When the measurement is carried out behind the projectile, the cylindrical shape of the base is used, as a result of which the measurement is independent of the shape of the nose of the projectile. In this case, the base influences the electromagnetic field. This respective change is detected by a receiving coupler, and is supplied to an evaluation device.

The advantage of the measurement method after the projectile has passed through is that most types of projectiles have cylindrical flat bases while, in contrast, the measurement method before the projectile passes through has to take account of the geometry of the nose (cone, spherical cap, etc). Compensation is possible, because the munition type is generally known. Projectile-specific values are therefore used, which then allow the influence of the nose on the measurement to be compensated for.

The signal generator (for example an oscillator) produces a signal at a constant mid-frequency which is operated below the lowest cut-off frequency of the waveguide. A plurality of waveguide modes ($TE_{mn}$ where m=0, 1, 2 ... and n=1, 2, 3 ...) are excited by the geometry and nature of the transmission coupler (coil, dipole etc). The signal generator generates either a carrier in the continuous-wave mode (CW mode) or a modulated signal.

The distance between the transmission coupler, which itself receives the signals from the oscillator, and the receiving coupler is variable and can be chosen individually depending on the mode selection of the waveguide, but is dependent on the calibre, the internal size of the waveguide, and the frequency.

BRIEF DESCRIPTION OF THE DRAWING

The invention will be explained in more detail using one exemplary embodiment and with reference to the drawing, in which.

DETAILED DESCRIPTION OF THE INVENTION

Figure 1:
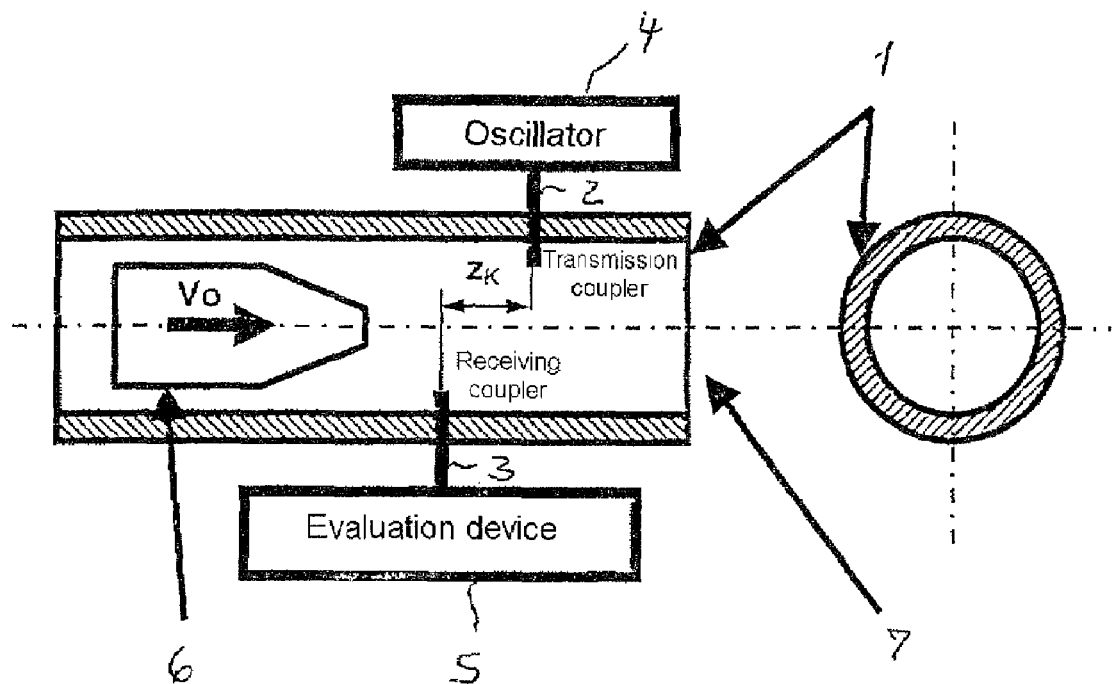
FIG. 1 shows a measurement arrangement for measurement of the muzzle velocity of a projectile in front of the projectile.

Reference numeral 1 denotes a smooth waveguide (barrel) in which (at least) one transmission coupler 2 and (at least) one receiving coupler 3 are included. An oscillator 4 is connected to the transmission coupler 2, and an evaluation device 5 is connected to the receiving coupler 3. The abovementioned elements can be used to determine the muzzle velocity of a projectile 6. Reference numeral 7 denotes the muzzle of the weapon barrel or firing barrel 1.

Figure 2:
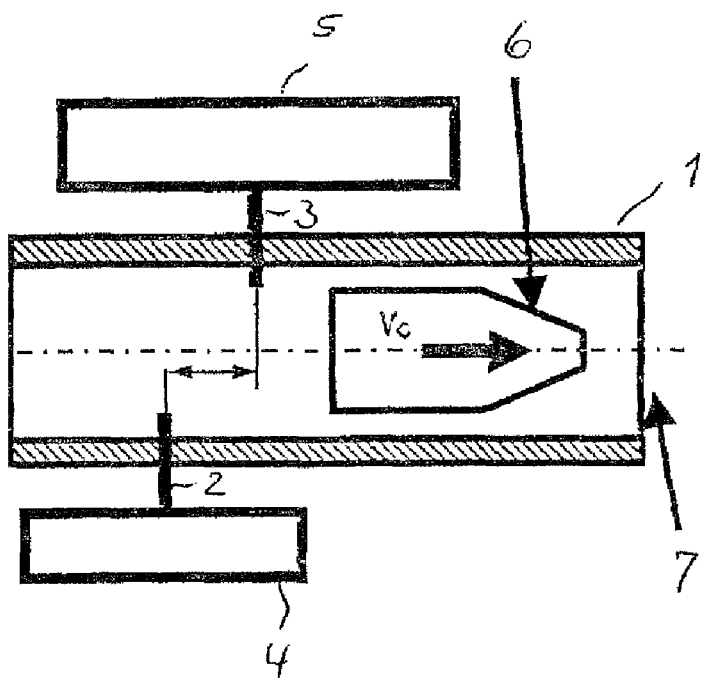
FIG. 2 shows a measurement arrangement for measurement of the muzzle velocity of the projectile behind the projectile.

Via the transmission coupler 2, the oscillator 4 excites a waveguide mode (transversal electrical=TE and transversal magnetic=TM.—The desired waveguide mode is excited by mechanical and electromagnetic mode selection.—). In a first step, the electromagnetic field is measured without a projectile 6. The "barrel" 1 (waveguide 1) system results in a signal strength which the receiving coupler 3, for example a pick-up sensor, receives, and which is passed to the evaluation unit 5. The measurement is then carried out in front of the projectile 6 (FIG. 1) or behind the projectile 6 (FIG. 2).

The distance between the transmission coupler 2 and the receiving coupler 3 is variable and can be chosen individually depending on the mode selection of the waveguide 1, but is dependent on the calibre, the internal size of the waveguide 1 and the frequency.

When waveguide modes are excited by the transmission coupler 2, then the received signal (for example induced voltage) may have the following form at the receiving coupler 3:

$$U_{Ind} = \sum_{n=1}^{\infty} A_n \cdot e^{-\frac{p_n}{a} \cdot z_k}$$

where a is the internal radius of the waveguide 1 and $A_n$ and $p_n$ are functions of n. In this case, $p_1 < p_2 < p_3 < \ldots$.

For its part $z_k$ is chosen such that the received signal, for example, is dominated only by the term n=1 (single mode operation):

$$\Rightarrow U_{Ind} \approx A_1 \cdot e^{-\frac{p_1}{a} \cdot z_k}$$

This is possible since the terms for n=2, 3, 4 for $z_k$ become very much smaller than the term n=1. This is important in particular because the term with n=1 ensures a reliable velocity measurement of the projectile flying through.

The term $$e^{-\frac{p_1}{a} \cdot z_k}$$

is primarily a function of a. a is governed by the calibre. Since the frequency of the transmission signal is lower than the cut-off frequency, the received signal has an exponential profile.

If the measurement is carried out after the projectile 6 has passed through, the receiving coupler 3 must be placed between the projectile base and the transmission coupler 2. If the measurement of the velocity $V_0$ is carried out before the projectile 6 passes through, the receiving coupler 3 should be located between the projectile nose and the transmission coupler 2. When the two measurement methods are combined, two receiving couplers 3 must be included in a corresponding manner. The transmission coupler 2 would then have to be included between the two receiving couplers 3.

The signal processing should be carried out as follows:

As is known, a characteristic signal is produced when the projectile 6 flies past the receiving coupler 3. The time profile of the received signal provides information about $V_0$.

In order now to obtain the $V_0$ from the received signal, the signal is sampled continually in time in the evaluation device 5, and the sample values are stored. This is also done when no projectile 6 is present. When a projectile 6 now flies through the waveguide 1, the evaluation unit 5 is aware of the presence on the basis of the characteristic profile of the received signal. These values are evaluated for $V_0$ determination.

Since the evaluation algorithm uses the internal radius a of the waveguide 1, temperature-dependent changes of the internal radius a can result in measurement inaccuracy. In order to compensate for these influences, for example, the empty waveguide is measured on each occasion before the projectile passes through. This current value is used to scale the relevant sample values, is stored and is called up by the evaluation unit for the measurement evaluation (calibration).

The invention claimed is:

1. An apparatus measuring muzzle velocity ($V_0$) of a projectile, comprising:
    a smooth weapon barrel or firing barrel as a waveguide, a signal generator electrically connected to a transmission coupler by a signal supply line for energizing the weapon barrel or firing barrel; and
    an evaluation device connected to at least one receiving coupler by a receiving line so that signals measured by the receiving coupler are passed to the evaluation device, wherein a distance between the transmission coupler and the at least one receiving coupler is variable and is selectable individually based on a first or a second mode selection of the waveguide, in the first mode the receiving coupler is arranged between a projectile base and the transmission coupler when a measurement is being carried out after the projectile has passed through, and in the second mode the receiving coupler is arranged between a projectile nose and the transmission coupler when the velocity ($V_0$) is measured before the projectile passes through.

2. The apparatus according to claim 1, wherein two receiving couplers are provided, a first receiving coupler being arranged between the projectile base and the transmission coupler, and a second receiving coupler being arranged between the projectile nose and the transmission coupler so that the transmission coupler is between the first and second receiving couplers.

3. The apparatus according to claim 1, wherein the signal generator generates a carrier in a continuous-wave mode (CW mode).

4. The apparatus according to claim 1, wherein the signal generator generates a modulated signal.

* * * * *